United States Patent [19]

Züllig

[11] Patent Number: 5,209,598

[45] Date of Patent: May 11, 1993

[54] CLAMPING DEVICE FOR RELEASABLY CONNECTING TWO PROFILED PARTS

[75] Inventor: Kurt Züllig, Kirchberg, Switzerland

[73] Assignee: Syma Intercontinental AG, Kirchberg, Switzerland

[21] Appl. No.: 835,842

[22] Filed: Feb. 18, 1992

[30] Foreign Application Priority Data

Mar. 25, 1991 [CH] Switzerland ............................ 903/91
Nov. 6, 1991 [CH] Switzerland .......................... 3234/91

[51] Int. Cl.[5] .............................................. B25G 3/00
[52] U.S. Cl. ................................... 403/255; 403/254; 403/231
[58] Field of Search ..................... 403/255, 254, 406.1, 403/231, 252

[56] References Cited

U.S. PATENT DOCUMENTS 4,641,983  2/1987  Strassle ............................ 403/252 X

FOREIGN PATENT DOCUMENTS 2623814 12/1977  Fed. Rep. of Germany .
3821625 12/1989  Fed. Rep. of Germany ...... 403/255
2152941  4/1973  France .
2530937  2/1984  France .
WO8401801  5/1984  World Int. Prop. O. .

Primary Examiner—Andrew V. Kundrat
Attorney, Agent, or Firm—Sughrue, Mion, Zinn, Macpeak & Seas

[57] ABSTRACT

This clamping device is intended for releasably connecting two profiled parts (1,19). One of the profiled parts (1) is arranged so that an insert core (2) can be inserted and fixed in it. The core (2) has an axially movable bolt (7) having an end portion which comprises a projection (21) intended to be introduced in a slot of a second profiled part (19) in order to exert a force against an area of a portion of said second profiled part (19) partially covering said opening. A screw received in a threaded bush (4) engages the bolt (7) by means of a system of sliding surfaces (14,15) in order to displace the bolt axially. The bolt (7) has supporting means (27,28) for pivotally supporting holding pieces (17,17'). Said holding pieces and the interior walls of the insert core (2) have a second system of sliding surfaces (24,26) which owing to the axial movement of the bolt (7) cause a deviation of the holding pieces (17) having in its free end area said projection (21) intended to exert said force. Preferably, the thread of the screw (5) and the threaded bush (4) have a pitch of more than 1 mm per revolution, and preferably, the bolt (7) is led through a laterally expanded transverse hole of a threaded bush (4), and a transverse bore of the insert core (2) and the threaded bush (4) guided in it are designed in such a formlocking way that a lateral displacement of the threaded bush (4) along the transverse bore of the insert core (2) is possible.

15 Claims, 6 Drawing Sheets

5,209,598

CLAMPING DEVICE FOR RELEASABLY CONNECTING TWO PROFILED PARTS

FIELD OF THE INVENTION

The present invention relates to clamping device for releasably connecting two profiled parts.

BACKGROUND OF THE INVENTION

In Patent CH-567 591 an example of a clamping device is presented which serves to connect frames and/or panels composed of profiled parts. For this purpose a longitudinally displaceable bolt is provided, which is guided in a profiled part. At its top end the bolt is T-shaped in order to engage behind a groove of another profiled part. The longitudinal displacement of the bolt is achieved via an eccentric interaction of the conical tip of a screw and a conical recess in the bolt, which serves as a cam surface.

In a further embodiment of this clamping device, it has become known, from EP-B1-0 123 683, to secure the tie bolt by means of a rod with a widened end portion, and an insert core having expanding fingers and dogs projecting inwards to engage behind the widened end portion. Such a snap catch can also be built by a sleeve made in one piece with at least one longitudinal slot in which a pin, arranged diagonally in the rod, is guided.

SUMMARY OF THE INVENTION

It is objective of the present invention to create design for such a clamping device, in which the performance of the bolt is improved.

The present invention provides a clamping device for releasably connecting two profiled parts, wherein an insert core intended to be inserted and fixed in one of the profiled has an axially movable bolt having an end portion which comprises a projection intended to be introduced at least partially in an opening of a second profiled part in order to exert a force against an area of a portion of said second profiled part partially covering the opening, wherein a screw received in a threaded bush engages the bolt by means of a system of sliding surfaces in order to displace the bolt axially, wherein the bolt has supporting means for pivotally supporting at least one holding piece and wherein the holding piece and at least one of the interior walls of the insert core having a second system of sliding surfaces which owing to the axial movement of the bolt cause a deviation of the holding piece having in its free end area the projection intended to exert the force.

BRIEF DESCRIPTION OF THE DRAWINGS

The invention is explained by way of example as follows with reference to the drawing. The figures shown are.

DETAILED DESCRIPTION OF THE PREFERRED EMBODIMENT

Figure 1:
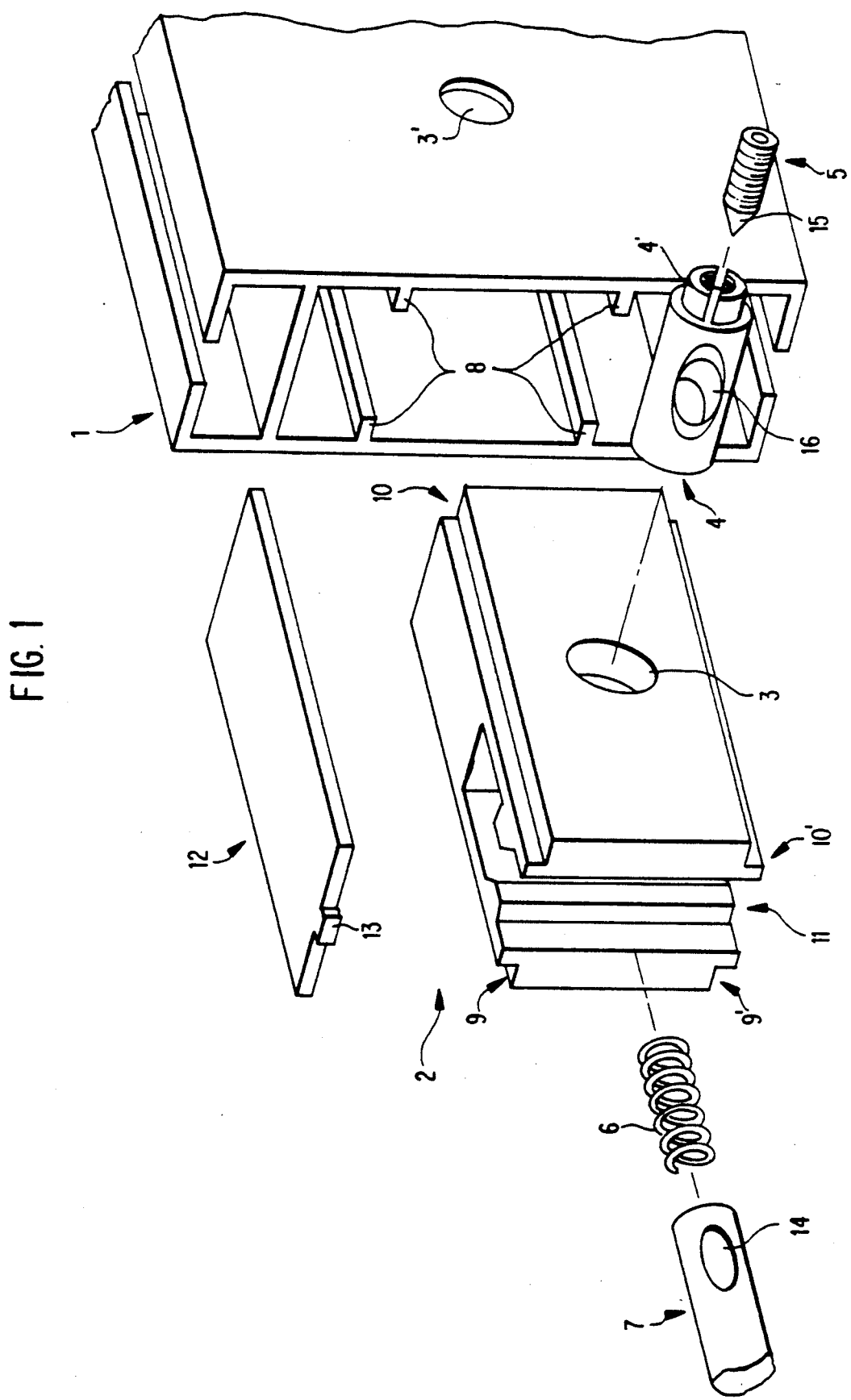
FIG. 1 is an exploded view of the inventive clamping device with an insert core and a first profiled part.

FIG. 1 shows one of many profiled parts 1 which can be used to assemble a frame as shown in FIG. 1, an insert core 2 which is made of a light material, such as plastic, can be pushed and firmly secured in the profiled part 1. The insert core 2 is provided with two bores, a first transverse bore 3 which allows the uptake of a fixing bush 4 together with a grub screw 5, and a second longitudinal bore (not shown in FIG. 1), for a coil spring 6 and a tie bolt 7.

The profiled part 1 preferably has a right-angled cross section with a large cavity and guide rails 8 which allow the insert core 2 to be fitted therein. In order to make the fitting easier, the insert core 2 can be provided with shoulders 9, 9', 10 and 10'. The insert core 2 has on its left front side an opening 11 which is perpendicular to the axis of the bore 3 and which can, if necessary, be covered laterally by two side plates. In FIG. 1 such a side plate 12 is shown which on its left frontal surface has a projecting part 13 which juts out from the middle thereof. The plate 12 and the shoulders 9 and 10 yield two grooves which make the fitting of the insert core 2 via the guide rails 8 easier. The same is true for a side plate which, although not shown in FIG. 1, could be fitted under the insert core 2. These side plates are preferably made of plastic material.

The tie bolt 7 is accommodated in a movable condition in the longitudinal bore of insect core 2 whereby between the end of the tie bolt 7 and the end of the bore longitudinal the coil spring or compression spring 6 is accommodated. The tie bolt 7 has a recess 14 which may be almost conically shaped or may be ovoidal shaped as shown in FIG. 1. The end or tip 15 of the screw 5 is inserted into the recess 14. The screw 5 is led through the fixing or threaded bush 4 which itself can be introduced into the bore 3 of the insert core 2. The bush 4 has a transverse bore 16 for the uptake of the tie bolt 7. The conical tip 15 of the screw 5 interacts with the large approximately conical or avoidal recess 14 in accordance with the principle of inclined surfaces and displaces the tie bolt 7 to the right (FIG. 1) by which the clamping device is closed.

Figure 2:
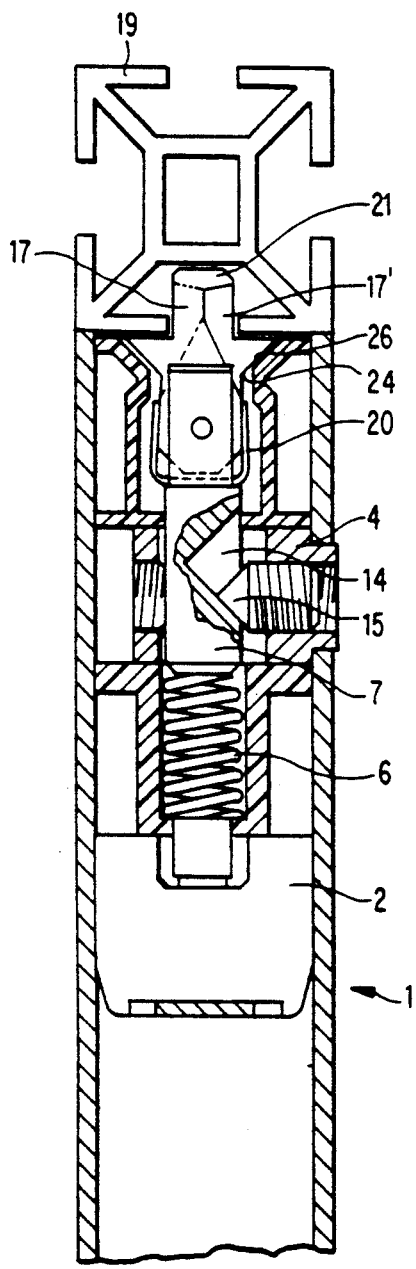
FIG. 2 is a diagrammatic representation of the assembly of the clamping device according to the invention with a view across the longitudinal axis of a fixing bush.
Figure 3:
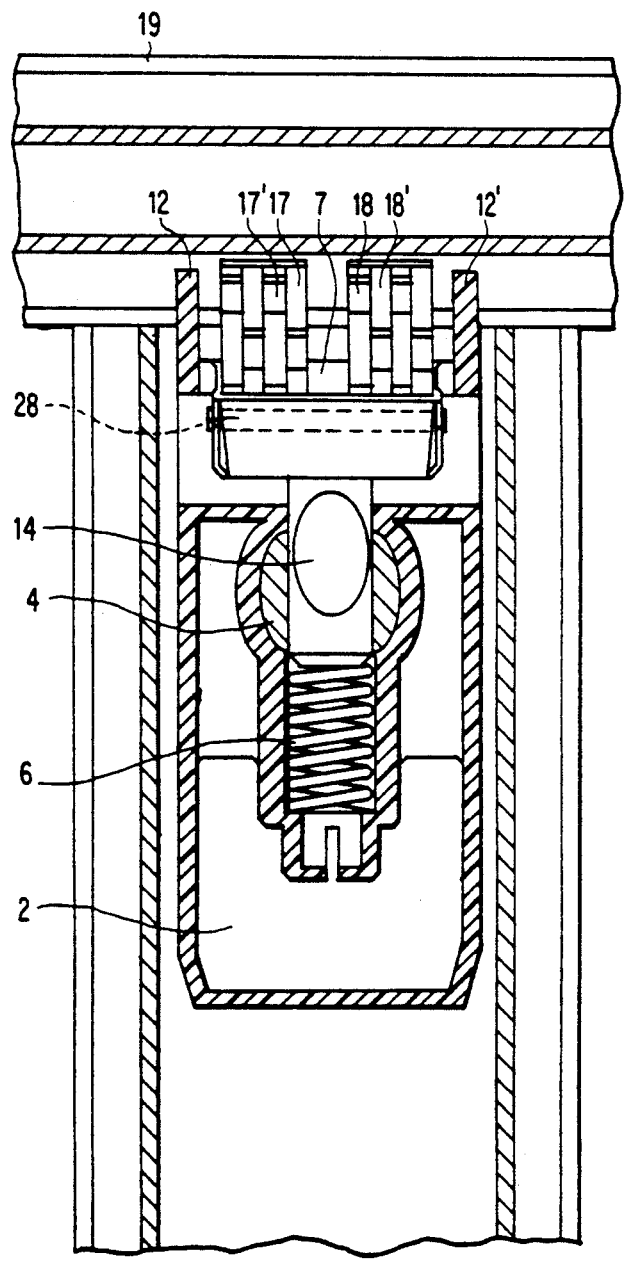
FIG. 3 is a diagrammatic representation of the inventive clamping device with a section transversal to the longitudinal axis of the fixing bush.

In FIGS. 2 and 3 the longitudinal bore of the insert core 2 is seen where the spring 6 and the tie bolt 7 are accommodated. The bolt 7 is intended to support different holding pieces 17, 17', 18 and 18'. These holding pieces are piled up on top of one another in two groups in reverse.

FIG. 2 also shows a second profiled part 19 with at least one slot in which the ends of the holding pieces are inserted. Such holding pieces 17, 17′, 18 and 18′ can be held in a nonoperative position with the aid of a profiled spring peg 20. In FIG. 3, for instance, two groups of holding pieces of thickness e are represented and indeed four pieces 17, 17′ . . . to the left and 18, 18′. . . to the right, where the pieces 17, 18′ are accommodated in one position and the pieces 17′ and 18 in the reverse position.

Figure 4:
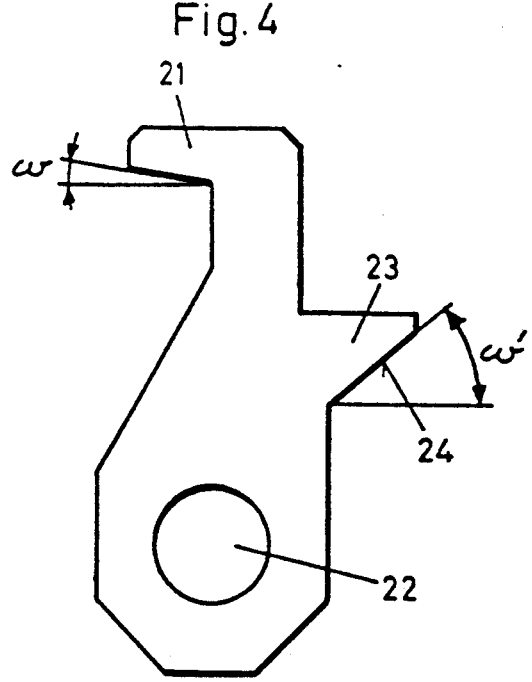
FIG. 4 is a plan view of a holding piece in the inventive clamping device.

In FIG. 4 the design of a holding piece is shown which has at one end area thereof a projection 21, at the other end area thereof a bore 22 and in the middle area thereof an enlargement 23 with an inclined surface 24.

Figure 5:
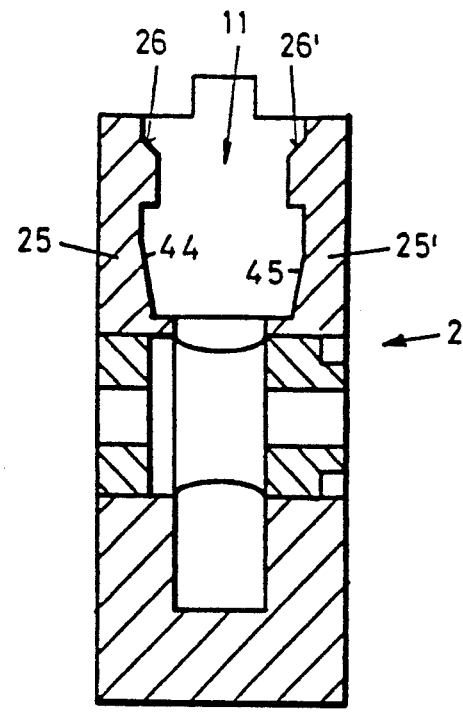
FIG. 5 is a side view of another embodiment of an insert core according to the invention.
Figure 8:
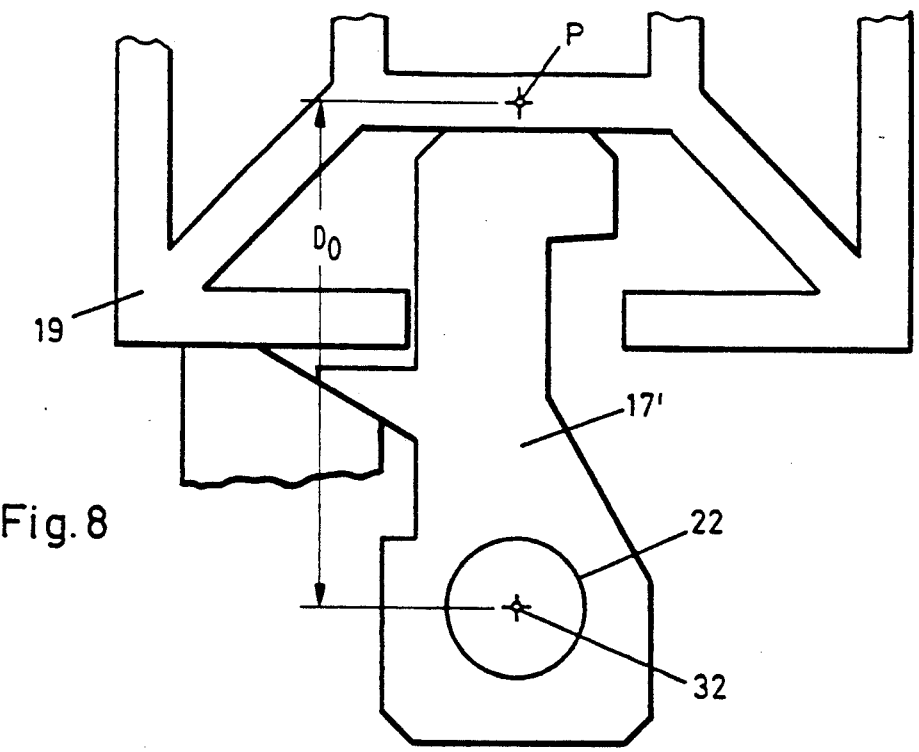
Figure 9:
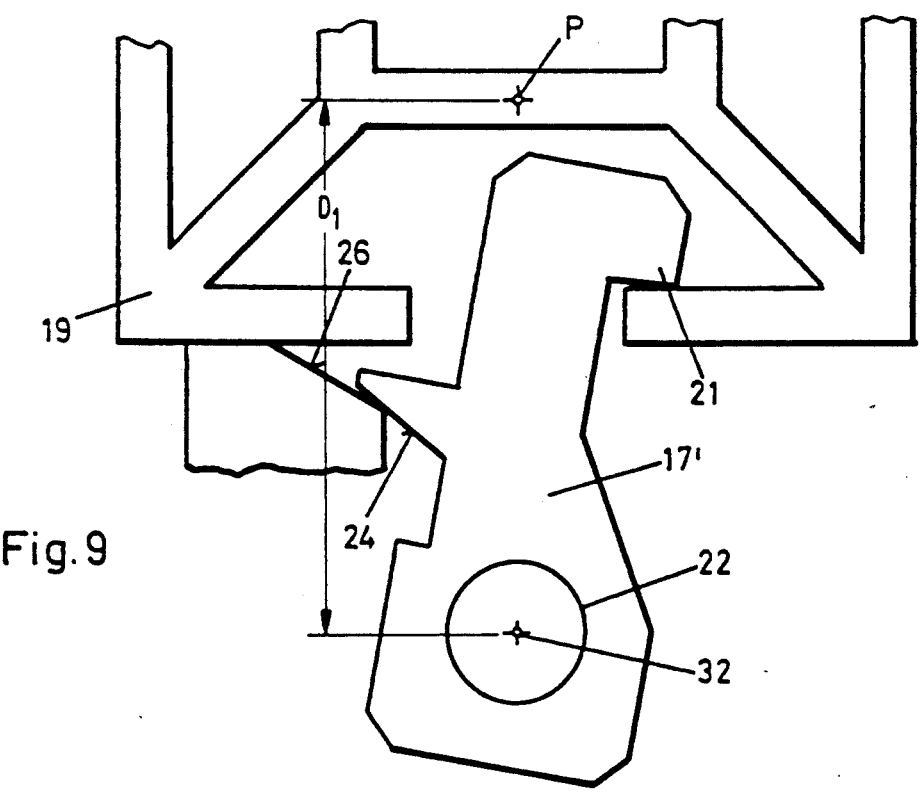
Figure 10:
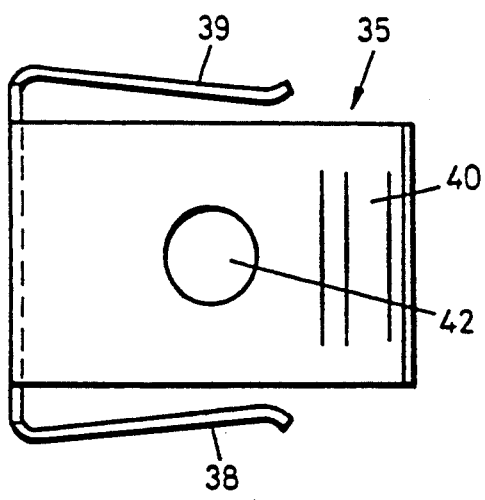
FIGS. 10 and 11 are respective front and side views of a variant of clamping spring for the support of the holding pieces according to the invention.
Figure 13:
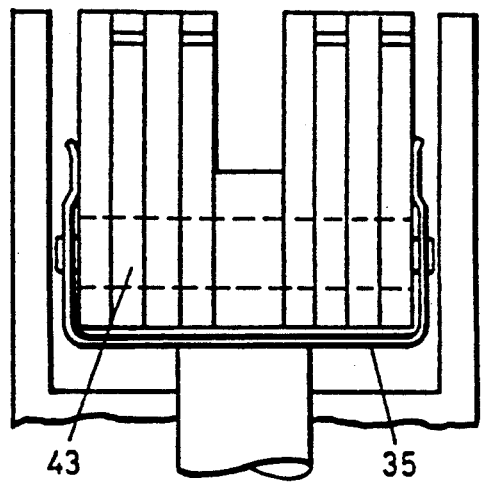
FIG. 13 is a diagrammatic representation of the operation of a clamping spring according to the invention.
Figure 11:
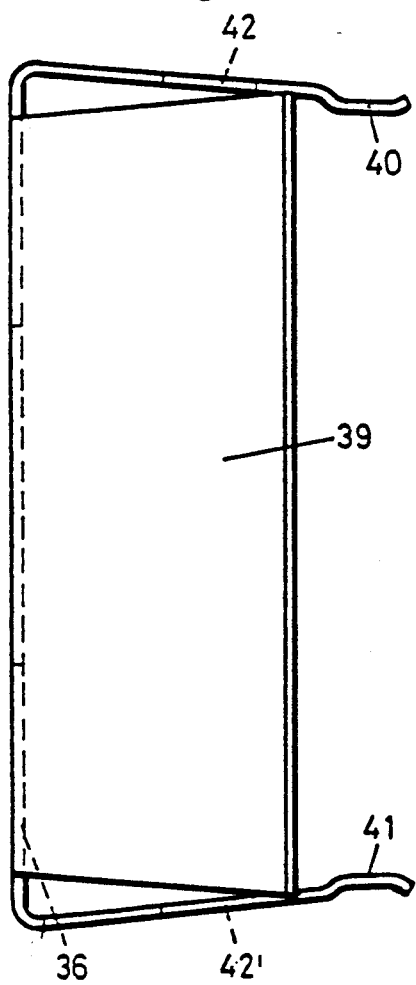

In FIG. 5 a variant of the insert core 2 is represented whose walls 25, 25′ laterally define the opening 11, and each of the walls 25, 25′ has a slope 26, 26′ which is intended to interact with the inclined surfaces 24 of the holding pieces (FIG. 4) in the manner shown in FIGS. 8 and 9.

Figure 6:
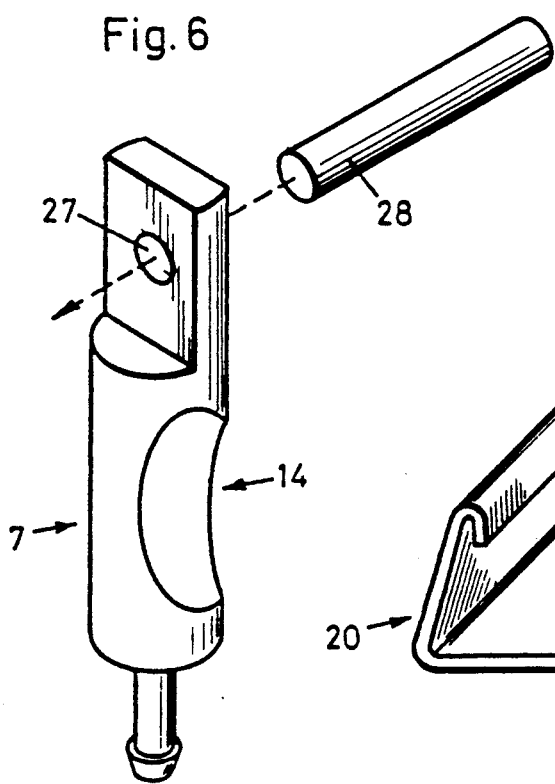
FIG. 6 is a perspective representation of a tie bolt with a transverse mountable tie bolt according to the invention.

In FIG. 6 a tie bolt 7 (also partly displayed in FIG. 1) is shown which has a cylindrical part in which a conical recess 14 is located and a flattened part which has a hole 27 into which a rod 28 can be inserted. The rod 28, which can also be seen in FIG. 3, serves to support the holding pieces which themselves have been provided with bores 22 for this purpose. Such holding pieces can be punched out of light metal or steel. The rod 28 can be centred.

Figure 7:
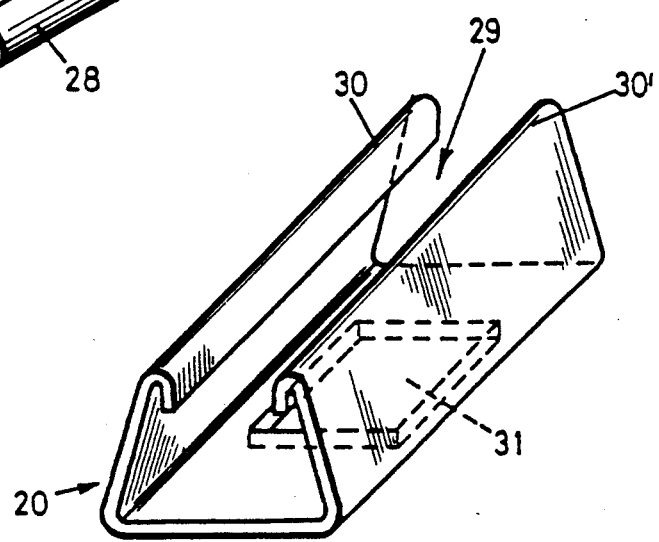
FIG. 7 is a perspective representation of a spring peg profile for flat holding pieces according to the invention, FIGS. 8 and 9 correspond to a diagrammatic representation of a holding piece in both open and closed positions according to the invention.

The profiled spring peg 20 depicted by way of example in FIG. 7 has an approximate trapezoidal cross section. The longitudinal edges 30, 30′ by the opening 29 of the profiled spring peg are flanged so that the holding pieces can be held laterally more securely. The base of the profiled spring peg 20 has an opening 31 for the tie bolt 7 which may be secured to spring peg 20. The spring action of the profiled spring peg 20 enables the holding pieces 17, 17′ . . . 18, 18′ . . . to be supported in such a way that their ends form a kind of block whose width is smaller than the width of the second profiled part 19 (in which they are commonly introduced) and is in fact independent of the orientation of the individual holding pieces with respect to the projection 21 (FIG. 4) alternating to the left or the right.

The device according to the invention functions as follows:

In the non-operative position, the holding pieces, for example piece 17′ in FIG. 8, can be introduced perpendicularly into the slot of the second profiled part 19. The distance between axis 32 of bore 22 of holding piece 17′ or rod 28 of tie bolt 7 (FIGS. 6, 3 and 1) to a reference point P of the profiled part 19 in this position is distance Do. It can be seen from FIG. 2, that in this open position the deepest point of the recess 14 of the bolt 7 is shifted relative to the axis of rotation of the screw 5 (FIG. 1) or relative to the axis of symmetry of the fixing bush 4. By turning the screw 5 in the recess 14, the tie bolt (FIG. 2) is moved downwards so that the distance Do between the axis 32 in FIG. 9 and point P becomes greater than Do. The inclined surface 24 of the holding piece 17′ slides over the slope 26 of the insert core and causes a rotation of the holding piece 17′ about the axis of rod 28 until the projection 21 engages behind the longitudinal slot or the groove of the profiled part 19. Because the different holding pieces function separately, the result is an excellent fastening of these profiled parts 1 (FIG. 1) and 19 (FIG. 9).

The pinch effect according to the invention ca be achieved with one single holding piece. In practice, however, two or more holding pieces can be used for each clamping device. Very good results could be achieved, independent of the sequence, with each of three holding pieces to the left and right in the tie bolt 7. The slopes 26 can be provided in the end region (FIG. 2) of the walls in the opening 11, or a little further inside the insert core 2 (FIG. 5).

The slopes 26 can also be curved. In addition it is worth mentioning that by suitably sizing the profiled spring peg 20 (which in itself is not strictly necessary) the spring 6 could be eliminated.

It naturally follows that many variants are possible with for instance n holding pieces to the right and/or to the left, whereby n can also be equal to 1; in this case, the holding piece would be, e.g., a holding block of height $h = n \times e$.

The screw 5 with the conical tip 15 and the recess 14 of the tie bolt 7 constitute a system of cam surfaces or sliding surfaces, and such a system could also be made by other means, e.g. by a dihedrally shaped recess 14 in the bolt and a dihedral dog accommodated between the bush 4 and the tie bolt 7, so that a screw preferably without a tip can press the dihedral dog against the dihedrally shaped recess.

Finally, the profiled part 1 is, according to FIG. 1, provided with a bore 3′ so that insertion of screw 5 through portion 4′ of the threaded bush 4 the resulting interaction allows the insert core 2 to be held firmly in place in the profiled part 1.

In a further embodiment of the invention the profiled spring can be a double acting clamping spring. Such a clamping spring is shown in FIGS. 10 to 13. This clamping spring 35 consists of a base 36 with a round bore 37, two elongated side walls 38, 39 and two narrow side walls 40, 41 each of which can be provided with a small round bore 42, 42′. Such a clamping spring can be efficient laterally on the narrow sides of all the holding pieces and/or on the extreme flat sides of the block which has been formed by the holding pieces. The rod 43 can have a constriction at each of its ends so that it can be held in the clamping spring between bores 42 and 42′. The spring 20 in FIG. 7, which is a simplified version of spring 35 but without narrow sidewalls, could in any case have a round hole in the base whose diameter is greater than that of the tie bolt.

In a further embodiment of the invention the insert core can be provided in one piece instead of having two plates stuck on a central body. In addition, the insert core can also be constructed similarly to that described in the EP-B1-0 123 683 from the point of view of the guide grooves and/or the holding catch, whereby as a holding catch it can also serve as a nut which can be screwed on to a corresponding elongation of the tie bolt. The working surface of the projection 21 (FIG. 4) has a bevel with an angle W of about 10°. For the bevel of plane 24 in FIG. 4 it is appropiate that the angle W′ be about 40°.

Figure 14:
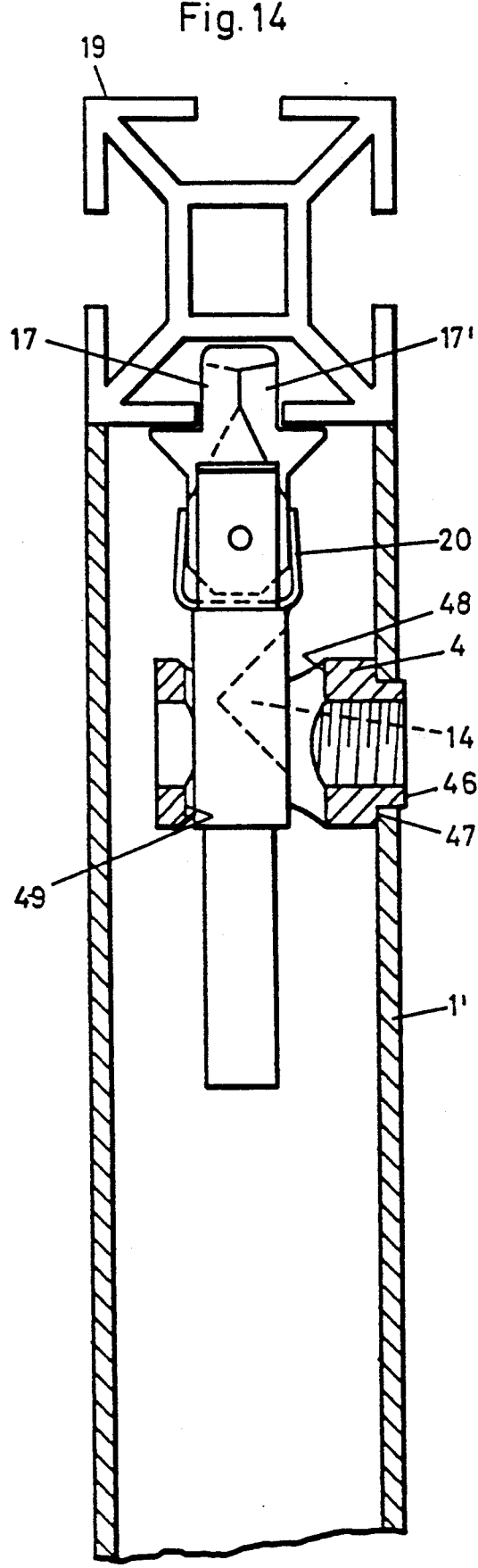
FIGS. 14 and 15 represent a diagrammatic representation of the operation of a safety mechanism in blocked and liberated positions according to the invention.
Figure 15:
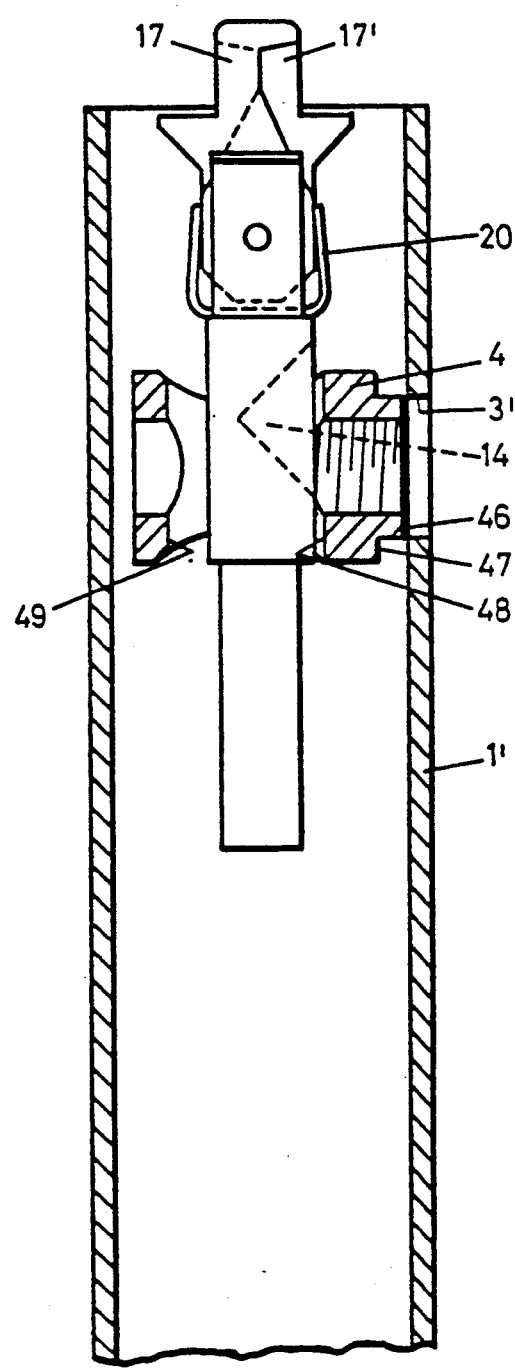

FIGS. 14 and 15 show the operation of the fixing bush 4 as a safety mechanism for blocking the axial movement of the bolt 7. This safety effect is caused by itself due to the attraction of the bush 4 (FIG. 1) to the outer periphery of the opening 3′ of the profiled piece 1 (FIGS. 1 and 14) which causes locking. This means, as indicated in FIG. 14 (without the screw 5), that, if the clamping device clamps, it is blocked by itself. However, if the screw 5 is not exerting, then the clamping device is freed (FIG. 15). In this case the bush 4 can be pressed into section 1, so that the housing can be easily taken out. For this purpose the diameter of the hole 16 (FIG. 1) of the bush 4 is a few mm larger than the diameter of bolt 7 in the region of the clearance 14 whereby the hole 16 can also be oval or a "parallel long hole" with rounded off edges so that it is possible to allow a lateral displacement between the bolt 7 and the bush 4.

It has been surprisingly shown that for this kind of applications the pitch of the thread of the screw 5 or the bush 4 (FIG. 1) can be larger than 1 mm for each revolution. Very good results can be achieved e.g. with values of 3 and 4,5 mm for each revolution. It is preferable to use a trapezoidal thread, for example Type M10X3. Such a locking system and/or such a pitch of the thread can generally be used in clamping devices of this kind.

Figure 12:
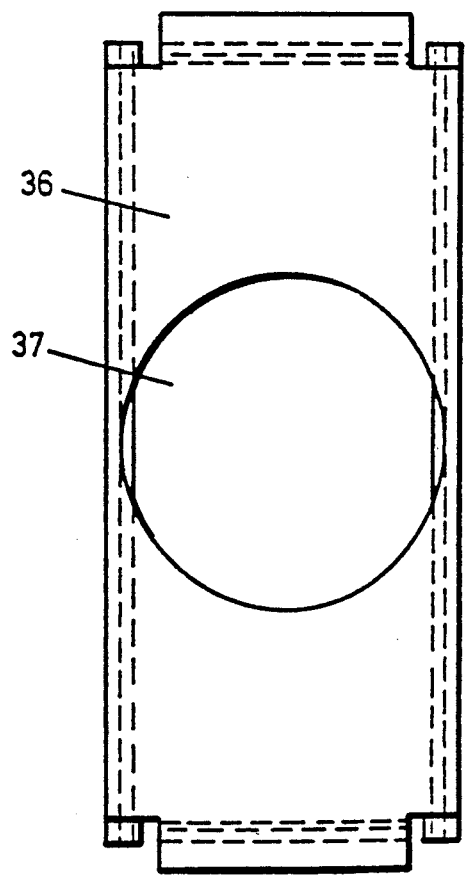
FIG. 12 is a plan view of the clamping spring of FIGS. 10 and 11.

In contrast to the construction of the springs as shown in FIG. 7, the springs in FIGS. 14 and 15 have a slight trapezoidally formed cross section, which could also be neglected if the casing 2 (FIG. 5) in the lower region of the space where spring 20 is inserted has bevelled surfaces 44, 45 on the inside which act as a guide for the base of spring 20. This construction can be important especially in the case where the side walls of spring 20 pass vertically to the base 36 as shown in FIG. 12.

The threaded bush 4, as shown in FIGS. 14 and 15, has an outer frontal area 46, a shoulder area 47, a near supporting area 48 and a rear support area 49. On locking the frontal area 46 in the hole 3', the shoulder area 47 can be supported against the edge of the wall of the hole 3'. The distance between the surfaces 48 and 49 corresponds to the expanded diameter of the transverse bore 16 which should preferably be an "oblong hole" (or "slotted hole"). The distance between surfaces 46 and 48 (FIG. 15) is preferably a little smaller than the smallest distance between the inside of wall 1' and bolt 7 in the region of the recess 14, and the distance between surfaces 47 and 49 (FIG. 14) is preferably only a little larger than the largest distance between the inside of wall 1' in the region of the hole 3' and bolt 7 in the region behind the recess 14.

The constructions with trapezoidal threads and/or holding pieces can be applied even without expansion of the transverse hole 16. The first construction is faster because one has to turn the trapezoidally threaded bolt less in order to clamp the device.

I claim:

1. A clamping device for releasably connecting two profiled parts (1,19) wherein an insert core (2) intended to be inserted and fixed in one of the profiled parts (1) has an axially movable bolt (7) having an end portion which comprises a projection (21) intended to be introduced at least partially in an opening of a second profiled part (19) in order to exert a force against an area of a portion of said second profiled part (19) partially covering said opening, wherein a screw (5) received in a threaded bush (4) engages the bolt (7) by means of a system of sliding surfaces (14,15) in order to displace the bolt axially, wherein the bolt (7) has supporting means (27,28) for pivotally supporting at least one holding piece (17,17',18,18') and wherein said holding piece and at least one of the interior walls of the insert core (2) have a second system of sliding surfaces (24,26) which owing to the axial movement of the bolt (7) cause a deviation of the holding piece (17) having in its free end area said projection (21) intended to exert said force.

2. A clamping device as claimed in claim 1, wherein said supporting means (27,28) supports several individually hinged holding pieces (17,17',18,18').

3. A clamping device as claimed in claim 2, wherein said holding pieces are arranged flat and alternating with the projection (21) in one or the other direction.

4. A clamping device as claimed in claim 2 or 3, wherein said supporting means (27,28) comprises a rod (28) arranged in the end region of the bolt (7).

5. A clamping device as claimed in claim 1 wherein the working surface of the projection (21) of the holding pieces has a bevel.

6. A clamping device as claimed in claim 1, wherein the second system of sliding surfaces comprises at least one slope (26, 26') on the inside of a wall (25,25') of the insert core (2) and one inclined surface in an extension (23) of the holding pieces.

7. A clamping device as claimed in claim 1, wherein the holding pieces are partly clamped on the inside of a spring (20;35).

8. A clamping device as claimed in claim 1, wherein the insert core (2) has bevelled surfaces (44,45) in order to facilitate at least approximately a centered introduction of the holding pieces beared by the supporting means.

9. A clamping device for releasably connecting two profiled parts (1,19) wherein an insert core (2) intended for being inserted and fixed in one of the profiled parts (1) has an axially movable bolt (7) having an end portion which comprises a projection (21) intended to be introduced at least partially in an opening of a second profiled part (19) in order to exert a force against an area of a portion of said second profiled part (19) partially covering said opening, wherein a screw (5) received in a threaded bush (4) engages the bolt (7) by means of a system of sliding surfaces (14,15) in order to displace the bolt axially, so that said projection owing to said axial movement of the bolt (7) exerts said force against said second profiled part, and wherein the thread of, the screw (5) and the threaded bush (4) have a pitch of at least 3 mm per revolution.

10. A clamping device for releasably connecting two profiled parts (1,19) wherein an insert core (2) intended for being inserted and fixed in on of the profiled parts (1) has an axially movable bolt (7) having an end portion which comprises a projection (21) intended to be introduced at least partially in an opening of a second profiled part (19) in order to exert a force against an area of a portion of said second profiled part (19) partially covering said opening, wherein a screw (5) received in a threaded bush (4) engages the bolt (7) by means of a system of sliding surfaces (14,15) in order to displace the bolt axially, so that said projection owing to the axial movement of the bolt (7) exerts said force and wherein the bolt (7) is led through a laterally expanded transverse hole (16) of a threaded bush (4) and wherein a transverse bore (3) of the insert core (2) and the threaded bush (4) guided in it are designed in such a form-locking way that a lateral displacement of the threaded bush (4) along the transverse bore (3) of the insert core (2) is possible.

11. A clamping device as claimed in claim 1, wherein said supporting means supports only one individually hinged holding piece.

12. A clamping device as claimed in claim 1, wherein said supporting means supports only one pair of hinged holding pieces.

13. A clamping device as claimed in claim 10, wherein the thread of the screw and the threaded bush have a pitch of at least 3 mm per revolution.

14. A clamping device as claimed in claim 1, wherein the thread of the screw and the threaded bush have a pitch of at least 3 mm per revolution.

15. A clamping device as claimed in claim 1, wherein the bolt is disposed through a laterally expanded transverse hole of the threaded bush, and wherein a transverse bore of the insert core and the threaded bushed guided therein are form-locked such that the threaded bush is laterally displaceable along the transverse bore of the insert core.

* * * * *

UNITED STATES PATENT AND TRADEMARK OFFICE
CERTIFICATE OF CORRECTION

PATENT NO. :   5,209,598
DATED      :   May 11, 1993
INVENTOR(S) :  Kurt ZULLIG

It is certified that error appears in the above-identified patent and that said Letters Patent is hereby corrected as shown below:

In column 1, line 11, change "CH-567 591" to --CH-576 591--.

Signed and Sealed this

Twenty-second Day of February, 1994

Attest:

BRUCE LEHMAN

Attesting Officer      Commissioner of Patents and Trademarks